United States Patent [19]

Schwarz

[11] 3,879,538

[45] Apr. 22, 1975

[54] EMPLOYMENT OF SELENIUM COMPOUNDS IN LIVING ORGANISMS

[75] Inventor: Klaus Schwarz, Huntington Park, Calif.

[73] Assignee: The Regents of the University of California, Berkeley, Calif.

[22] Filed: Oct. 24, 1972

[21] Appl. No.: 300,282

[52] U.S. Cl. ............................. 424/319; 260/534 R
[51] Int. Cl. ............................................ A61v 27/00
[58] Field of Search.................. 260/534 R; 424/319

[56] References Cited
OTHER PUBLICATIONS
Chem. Abst. (1), 31 – 49558 (1937).

Chem. Abst. (2), 32 – 25102 (1938).

Primary Examiner—Stanley J. Friedman
Attorney, Agent, or Firm—Albert M. Herzig; Edward C. Walsh; Delmar H. Larsen

[57] ABSTRACT

Certain organic selenium compounds having low toxicity and a high ratio of effectiveness to toxicity are used in nutrients for living organisms, such as plants and animals, or as direct additives to the organism itself.

10 Claims, No Drawings

EMPLOYMENT OF SELENIUM COMPOUNDS IN LIVING ORGANISMS

The invention described herein was made in the course of, or under, a grant from the Department of Health, Education, and Welfare.

This invention relates to selenium deficiencies in living organisms such as plants, animals, bacteria, and the like, and more particularly to the rectification of such deficiencies by the employment of certain selenium compounds which exhibit the necessary physiological activity and are at the same time relatively free from toxicity.

A number of elements have been found necessary to proper growth and development of living organisms even though the requisite amounts are mere traces. This is the case for many heavy metals for example, such as copper, zinc, cobalt, manganese, and many others, the requirements for which have been known for some time. Other elements have been recognized as essential in trace amounts only in relatively recent years. Selenium is such an element and even though it is toxic in relatively heavy concentration, nevertheless a certain minimum amount is necessary for proper growth and development of living organisms generally. The deficiency symptoms vary from species to species, as is to be expected. In many warm-blooded animals, selenium deficiency may be evidenced by such symptoms as necrotic liver degeneration, muscular dystrophy, cardiac degeneration, exudative diathesis, and others.

It might be thought that a simple solution to the problem of selenium deficiency would be simply to furnish to the organism any simple selenium compound. Unfortunately, this is not a practical solution.

In general, there is a great spread in the effective concentration range for any given compound, for a given organism. The result is that many selenium compounds cannot be used in a practical way to overcome selenium deficiency, because it is necessary to provide what is in effect a safety factor in treatment, because of the impossibility of accurate metering of the total selenium supplied under actual working conditions. Thus, where the deficiency is to be rectified by the addition of a selenium compound to animal foodstuffs, feeding habits of individuals may differ so that there is no satisfactory control on the total selenium intake of a given individual. The same situation holds where the organism involved is a plant and selenium is supplied as a component of fertilizer, used for supplying selenium to plants, especially where the fertilizer is liable to be consumed by animals. Accordingly it is highly desirable to have available selenium compounds which correct selenium deficiency at a relatively low range of concentration but which at the same time cause toxic symptoms only at much greater ranges of concentration. Microorganisms, particularly as employed in the fermentation industries, have requirements for selenium which are often difficult to meet.

Parenthetically, it may be remarked that in many cases when an organism exhibits the symptoms of selenium deficiency, the cause may not necessarily be a lack of selenium of any and all kinds in the organism's nutrient supply, but may reside in a disturbance of absorption or in a metabolic disorder whereby the particular form of selenium available to the organism cannot be properly utilized. In this specification and the claims which follow, the term "selenium deficiency" is meant to include such cases where absorption or utilization rather than primary supply is defective. The invention is equally and indeed outstandingly applicable to such cases, because of the inherent excellent utilizability of the particular compounds embraced within the scope of the invention.

An object of the present invention is to provide various selenium compounds of great effectiveness in overcoming selenium deficiencies in living organisms and simultaneously of low toxicity.

Another object of the invention is to provide means of furnishing nutrients to living organisms which rectify selenium deficiencies in a non-toxic fashion.

Other objects of the invention will appear as the description thereof proceeds.

Generally speaking, and in accordance with illustrative embodiments of the invention, I supply selenium to a selenium deficient organism in the form of an organic selenium compound selected from the compounds listed in Table 1, which follows. The compound in accordance with the invention may be supplied to the organism in any of a number of ways, some of which are more suitable for some classes of organisms than for others. In general, the selected compound or a mixture thereof may be added to the nutrient of the organism, such as for example to the liquid medium in which a particular microorganism is cultured; to the liquid or solid nutrient supplied to plants, as for example as an additive to fertilizer or irrigation water; and to the food or feedstuff for the case in which the organism is an animal. The selected compound or mixtures thereof may also be supplied directly to the organism in some cases when desired, as by injection or in the form of an oral tablet or solution or the like.

TABLE I

| Name | $LD_{50}$ | $ED_{50}$ | Therapeutic Index |
|---|---|---|---|
| Seleno bis (acetyl L-asparagine) | 2048 | 10 | 205 |
| Seleno bis (acetyl L-alanine) | 1024 | 6.1 | 170 |
| Seleno bis (acetyl L-glutamic acid) | 1024 | 7.5 | 136 |
| Seleno bis (acetyl glycine) | 512/1024 | 7.5 | 78–136 |
| Seleno bis (acetyl L-isoleucine) | 800 | 7.3 | 110 |
| Seleno bis (acetyl L-threonine) | 1024 | 9.8 | 105 |
| Seleno bis (acetyl L-valine) | 512 | 5.4 | 95 |
| Seleno bis(acetyl L-phenylalanine) | 512 | 6.1 | 84 |
| Seleno bis (acetyl L-leucine) | 600 | 9.7 | 62 |
| Seleno bis (acetyl L-tryptophan) | 256/512 | 8.2 | 31–62 |
| Seleno bis (acetyl L-tyrosine) | 256 | 11.7 | 22 |
| Seleno bis (propionyl L-valine) | 512/1024 | 5 | 102–204 |
| Seleno bis (valeryl L-valine) | 256/512 | 6 | 44–88 |
| 3-Propionamido seleno-propionic acid | 350 | 3.5 | 100.0 |
| 2,2'-Seleno bis acetamide | 2240 | 45 | 50.5 |
| 4,4'-Seleno bis n-butyramide | 96 | 7.92 | 12.0 |
| 4-Carboxy-butane-seleninic acid hydronitrate | 17.9 | 1.20 | 14.8 |
| 3-Chlorobenzyl-seleninic acid | 40.0 | 1.2 | 33.3 |
| Di-(2-chlorobenzyl)-monoselenide | 13.1 | 0.74 | 17.7 |
| Di-(4-chlorobenzyl)-monoselenide | 17.0 | 1.07 | 17.0 |

TABLE I-Continued

| Name | $LD_{50}$ | $ED_{50}$ | Therapeutic Index |
|---|---|---|---|
| Di-(4-chlorobenzyl)-diselenide | 32.0 | 1.1 | 32.0 |
| Benzyl-seleno-2-propionic acid | 32–128 | 2.4 | 13.3 |
| Benzyl-seleno-4-(2,2'-dimethylbutyric) acid | 32–128 | 9.4 | 3.4–13.6 |
| 4-Nitrobenzyl-seleno-5-valeric acid | 46 | 3.0 | 15 |
| 4-Bromobenzyl-seleno-3-isobutyric acid | 45.0 | 2.0 | 22.5 |
| 4-Bromobenzyl-seleno-5-(3-methylvaleric) acid | 16–32 | 2.0 | 8–16 |
| 4-Bromobenzyl-seleno-8-caprylic acid | 32 | 2.1 | 15.2 |
| 1-Naphthylmethylseleno-2-propionic acid | 64–128 | 6 | 11–22 |
| 2-Naphthylmethylseleno-2-n-butyric acid | 64–128 | 10 | 6.4–12.8 |
| 3-Indolylethylseleno-acetic acid | 64–128 | 9 | 7.1–14.2 |

In Table I, results are given of feeding experiments on rats as set forth in the paper by the instant inventor which appeared in Proc. Soc. Exp. Biol. Med., 80, 319 (1952). The basal diet was free of biologically active selenium, and the various selenium compounds listed in Table I were tested both for effectiveness in removing the symptoms of selenium deficiency, which in this case took the form of liver necrosis, by including the given compound in the diet at concentrations of the order of micrograms of selenium content per 100 grams of diet. The column headed $ED_{50}$ shows the 50% effective level for the given compound in micrograms of selenium content per 100 grams of diet to afford 50% protection against liver necrosis. Detailed data for experiments of this general type are shown in the paper by Schwarz and Foltz entitled "Factor 3 Activity of Selenium Compounds," Journal of Biological Chemistry, 233, 245 (1958).

The column headed $LD_{50}$ shows the amount of selenium in milligrams per kilogram of body weight in the form of the given compound which is lethal to 50% of the rats by intraperitoneal injection. In some cases, the toxicity was so low that toxic quantities could not be injected intraperitoneally. In these instances, a minimum figure is given.

The column headed "Therapeutic Index" is obtained by dividing the $LD_{50}$ figure by the $ED_{50}$ figure. Considering Table I, now, it will be seen first of all that a considerable range exists for the $ED_{50}$ figure, from slightly less than unity to several hundred. However, a considerable range is also presented by the $LD_{50}$ figures; and in all of the compounds listed in Table I and the use of which forms part of the present invention, the ratio of the two values, i.e., the therapeutic index, is quite high, and indeed not less than about 10 and in some cases higher than 100 for some of the compounds. Thus, the first entry in Table I requires only 10 micrograms (based on selenium content) for 100 grams of feed to provide 50% protection against liver necrosis, but it requires 2048 milligrams by injection before toxicity reaches the 50% level, under the conditions of the experiment. The therapeutic index is thus 205. This represents a very large "safety factor" indeed, in view of the fact that the $ED_{50}$ value is determined with microgram quantities, and the $LD_{50}$ value with milligram quantities.

All of the compounds in Table I are highly unusual in exhibiting a high therapeutic index. That the latter cannot be taken for granted by any means is apparent from Table II, which follows, in which some compounds listed in Table I appear together with some closely chemically related compounds. For example, the $LD_{50}$ figure for the butyric acid analog shown is 181, considerably higher than the 71 for the valeric acid compound. However, the $ED_{50}$ value is about 19 times higher, so that the therapeutic index is only 3.6 instead of 26.3, as for the valeric acid compound.

A similar situation holds for the next four entries in Table II, which it will be observed, form a homologous series. The acetamide and butyramide members (which also appear in Table I) have high therapeutic indexes, whereas the propionamide and valeramide members have quite low therapeutic indexes, and do not appear in Table I.

TABLE II

| Name | $LD_{50}$ | $ED_{50}$ | Therapeutic Index |
|---|---|---|---|
| Seleno-bis-n-valeric acid | 71 | 2.7 | 26.3 |
| Seleno bis-n butyric acid | 181 | 50.8 | 3.6 |
| 2,2'-Seleno bis acetamide | 2240 | 401 | 50.5 |
| 3,3'-Seleno bis n-propionamide | 9 | 4.3 | 2.25 |
| 4,4'-Seleno bis n-butyramide | 96 | 7.92 | 12.0 |
| 5,5'-Seleno bis n-valeramide | 12 | 1.95 | 6.0 |

While Table I exhibits the operation of the invention for the case of rats, because of the fundamental role which selenium appears to play in living organisms generally, it is considered that the compounds of Table I are applicable to living organisms generally. In this connection, it is to be remembered that selenium is an essential factor for the development and survival of species as diverse as fish, poultry, rodents, and ruminants. Indeed, it has recently been shown that selenium is essential to the activity of the enzyme glutathione peroxidase, which is of widespread and probably ubiquitous occurrence in the animal kingdom.

The method of supplying the selenium compounds of Table I to living organisms in accordance with the invention will naturally vary with circumstances and type of organism, as indeed has been briefly mentioned. Thus, for example, when the subject is an animal, it is in general a convenient route to add the compound to the feed or foodstuff. The amount to be used will vary from species to species, and will of course be dependent to some extent on the "background" selenium already available to the animal, as well as on any impairment of the animal as regards utilization. However, the general order of magnitude of the amounts to be used may be seen from Table I, from which it will appear that quantities of the order of micrograms per 100 grams of feed are usual. Of course, just as a skilled veterinarian takes into account all of the pertinent factors present in administering medication of any kind to a particular animal, and adjusts the quantity in accordance with these factors, those skilled in the art of animal and plant nutrition will understand that the dosage is to be tailored to the particular circumstances present.

In some cases, such as when an animal exhibiting selenium deficiency is to be treated therapeutically, it will be convenient to supply the selected compound or mixture of compounds of Table I in dosage form. For this purpose, the preselected dosage of the selected compound (or selected mixture of compounds) is placed in a pharmaceutically acceptable carrier. For solid dosage forms, such as pills or capsules, the carrier may be any of those commonly used, such as lactose, starch, glucose, and the like. For parenteral therapy, the dosage form may take the shape of ampules containing the selected compound (or mixture thereof) in a suitable liquid carrier, such as physiological aqueous saline solution, sesame oil, and the like. The quantity of the selected compound or mixture thereof for each individual dose will of course be selected on the basis of the potency of the compound, the average size of the animal to be treated, and the contemplated frequency of treatment.

Thus, for example, for the treatment of ovine muscular dystrophy resulting from selenium deficiency, 50 milligrams of the first compound listed in Table I may be encapsulated with 500 milligrams of lactose to provide a therapeutic composition in single dosage form.

The various selenium compounds disclosed herein have all been prepared by the usual preparative methods described in the literature for these classes of compounds. Representative articles showing the typical methods involved are the following:

Arne Fredga: Uppsala Universitets Arsskrift 1935 [5] Studien ueber Selen-di-karbonsaeuren und Diselen-di-karbonsaeuren.

Arne Fredga: Svensk Kemisk Tidskrift 42, 66 (1930) Ueber einige neue Selenderivitate aliphatischer Karbonsaeuren.

Arne Fredga: ibid 48 91 (1936) Eine Methode zur Darstellung von Karbonsaeuren organischer Selenide.

Arne Fredga & Gerd Bendz: ibid 54 119 (1942) Ueber einige γ-Selenderivate der n-Buttersaeure.

R. Lesser & R. Weiss: Berichte der d. ch. Ges. 57 1077 (1924)

The articles cited in this specification, together with the articles cited in the bibliographies of the said articles, are hereby incorporated by reference.

While I have described my invention with the aid of numerous specific examples, it will be understood that the invention is a broad one and many variations in detail of administration and the like are possible within the broad scope of the invention, as set forth in the claims which follow.

Having described the invention, I claim:

1. A method of treating selenium deficiency in an animal organism which comprises administering to the animal an effective, but non-toxic amount of at least one compound selected from the group consisting of seleno bis (acetyl L-asparagine), seleno bis (acetyl L-alanine), seleno bis (acetyl L-glutamic acid), seleno bis (acetyl glycine), seleno bis (acetyl L-isoleucine), seleno bis (acetyl L-threonine), seleno bis (acetyl L-valine), seleno bis L-phenylalanine), seleno bis (acetyl L-leucine), seleno bis (acetyl L-tryptophan), seleno bis (acetyl L-tyrosine), seleno bis (propionyl L-valine), and seleno bis (valeryl L-valine).

2. The method in accordance with claim 1 wherein said compound is seleno bis (acetyl L-asparagine).

3. The method in accordance with claim 1 wherein said compound is seleno bis (acetyl L-alanine).

4. The method in accordance with claim 1 wherein said compound is seleno bis (acetyl L-glutamic acid).

5. The method in accordance with claim 1 wherein said compound is seleno bis (acetyl glycine).

6. A composition for treating selenium deficiency in an animal organism comprising a pharmaceutically acceptable carrier together with an effective, but non-toxic amount of at least one compound selected from the group consisting of seleno bis (acetyl L-asparagine), seleno bis (acetyl L-alanine), seleno bis (acetyl L-glutamic acid), seleno bis (acetyl glycine), seleno bis (acetyl L-isoleucine), seleno bis (acetyl L-threonine), seleno bis (acetyl L-valine), seleno bis (acetyl L-phenylalanine), seleno bis (acetyl L-leucine), seleno bis (acetyl L-tryptophan), seleno bis (acetyl L-tyrosine), seleno bis (propionyl L-valine), and seleno bis (valeryl L-valine).

7. A composition of matter in accordance with claim 10 wherein said compound is seleno bis (acetyl L-asparagine).

8. A composition of matter in accordance with claim 10 wherein said compound is seleno bis (acetyl L-alanine).

9. A composition of matter in accordance with claim 10 wherein said compound is seleno bis (acetyl L-glutamic acid).

10. A composition of matter in accordance with claim 10 wherein said compound is seleno bis (acetyl glycine).

* * * * *